UNITED STATES PATENT OFFICE.

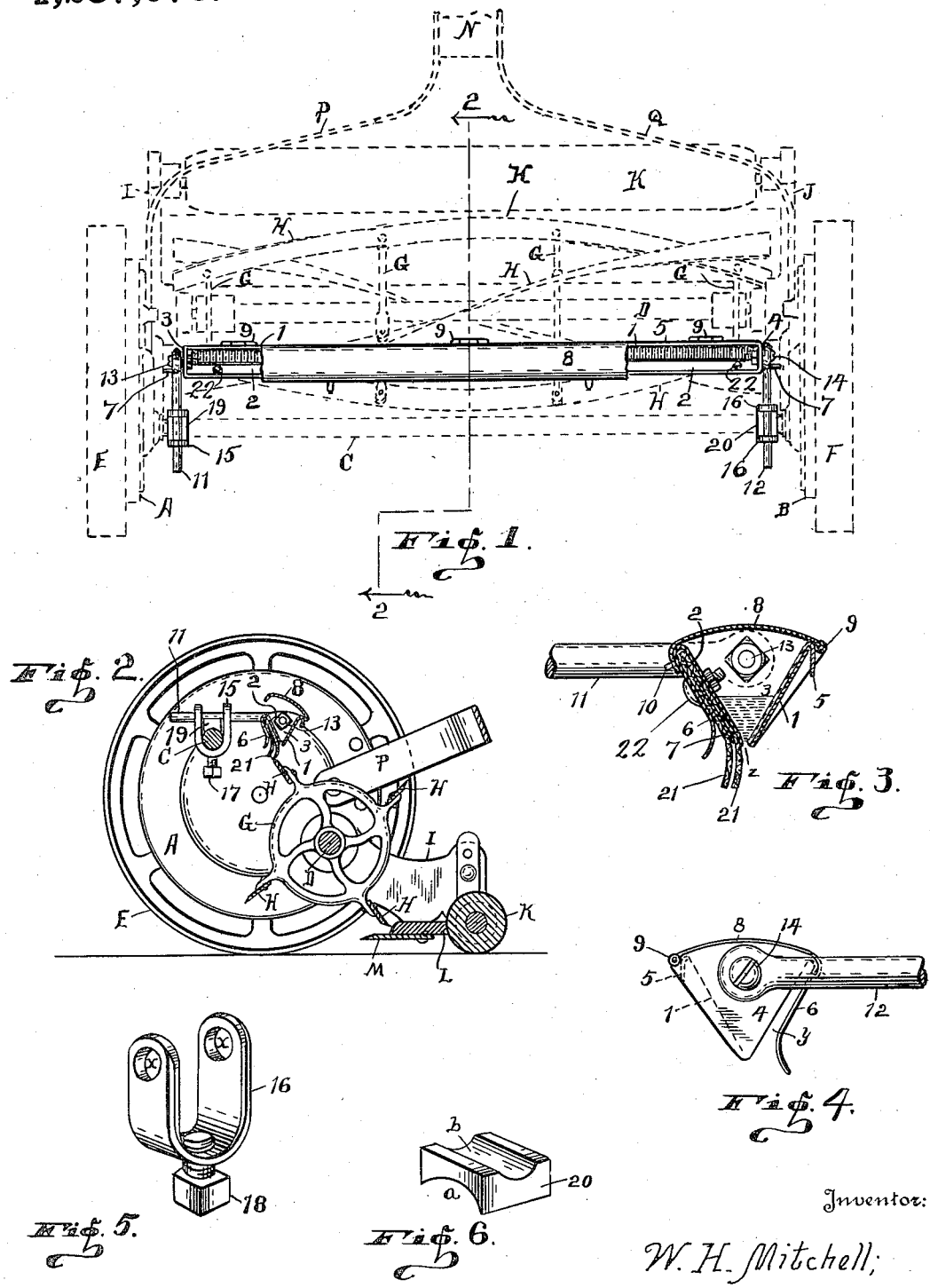

WILLIAM H. MITCHELL, OF RICHMOND, INDIANA.

ATTACHMENT FOR LAWN-MOWERS.

1,287,073.  Specification of Letters Patent.  Patented Dec. 10, 1918.

Application filed January 25, 1918. Serial No. 213,716.

*To all whom it may concern:*

Be it known that I, WILLIAM H. MITCHELL, a citizen of the United States, residing in the city of Richmond, in the county of Wayne, State of Indiana, have invented a new and useful Attachment for Lawn-Mowers, of which the following is a full, clear, and comprehensive specification and exposition, the same being such as will enable others to make and use the same with exactitude.

The object of my present invention, broadly speaking, is to provide an attachment for lawn mowers which will be strong and durable in construction, easily placed in position in connection with a lawn mower, practically automatic in its operation, adapted to save a great amount of time and expense, and which can be manufactured, sold and installed at a comparatively low price.

More specifically stated, my object is to provide an attachment for lawn mowers which may be quickly connected to any ordinary lawn mower and by the employment of which the reel-blades and the cutter-bar blade may be sharpened by simply propelling the lawn mower idly over the ground, and even operating to advantage when the lawn mower is employed in cutting grass in the usual manner, thereby dispensing with the necessity of removing the lawn mower to a shop and there employing an expert to do the work, which usually involves dismembering the mower and involving considerable time and expense.

By means of my invention the lawn mower to which it is attached may be sharpened at any time without discontinuing the use of the mower and without the operator being familiar with mechanics. Other objects and particular advantages of my invention will suggest themselves in the course of the following description, and that which is new and useful will be correlated in the claims.

The preferred means for carrying out my invention in a practical manner is shown in the accompanying drawings, in which—

Figure 1 is a top plan view of my invention as shown in connection with a lawn mower.

Fig. 2 is a cross section, taken on the line 2—2 of Fig. 1. Fig. 3 is a detail cross section of a portion of the invention alone, taken on the line 2—2 of Fig. 1, but on an enlarged scale. Fig. 4 is an end elevation of a portion of the invention alone. Fig. 5 is a detail perspective view of one of the two clamp-yokes. And Fig. 6 is a detail perspective view of one of the two clamp-blocks.

Similar indices denote like parts throughout the several views.

In order to make clear the adaptation of my invention I have shown a lawn mower to which my invention is connected. Said lawn mower comprises two main end members or castings A and B, which are connected by the tie-rod C. Located parallel with but some distance from said tie-rod is the reel-shaft D which is geared to be revolved by the ground wheels E and F as they travel over the ground. Secured on the shaft D are a plurality of spiders G to which are secured a plurality of spiral blades H. The shaft D, the spiders G, and the blades H are, for convenience, termed the reel. Letters I and J designate the respective rear projections of the members A and B, and the rear ends of said projections are supported by the ground roller K.

Secured to the lower edges of said projections is the cutter-bar L, which carries the stationary blade M. The blades H are adapted to operate in shearing contact with the blade M in the usual manner. Letter N denotes the handle by which the mower may be pushed over the ground, the same being connected with the members A and B by the respective arms P and Q.

The invention proper comprises a trough which is composed of the two sides 1 and 2 which extend convergently downward, with a very narrow mouth $z$ therebetween. The side 1 is corrugated or crimped at right angles to its length whereby the lower edges of the members 1 and 2 may touch each other yet the corrugations will form a multitude of small apertures through which oil may percolate by gravity.

The upper edge portion of the side 1 is turned out and down forming a flange 5, which stiffens the side 1 and causes it to extend in a straight line from end to end.

Integral with the upper edge of the side 2 is the comparatively large flange 6, which is simply a continuation of the side 2 doubled downward parallel with the outside of the side 2, with its lower edge curved outward whereby a narrow slot $y$ is formed between the side 2 and the flange 6. Numeral 7 denotes a bar or strip of sheet metal which is adapted to be inserted edgewise in the space $y$ and to extend from end to end thereof.

Numeral 8 denotes the curved top or lid which is adapted to close the upper opening of the trough as shown. Said lid is provided with hinges 9 whereby it is hinged to the flange 5, from which it curves over to forwardly in contact with the upper portion of the flange 6, where it may be detachably secured by catches 10.

The sides 1—2, the ends 3—4, the flanges 5—6, the lid 8, and the bar 7, are preferably formed of thin sheet metal, such as galvanized sheet iron, or other suitable material as desired.

Numerals 11 and 12 denote two arms, identical with each other, each of which has a flattened end portion with an eye formed therethrough for the respective bolts 13 and 14, whereby said arms are connected to the respective end members 3 and 4, from which said arms project directly forward above and beyond the rod C.

Numerals 15 and 16 denote the U-shaped yokes, the center portions of which are adapted to fit the rod C with the two sides of the yokes parallel with each other, as shown in Fig. 2. Formed through the center portion of each yoke is a threaded aperture to receive the respective set-screws 17 and 18. Alined apertures $x$ are formed through the two portions of each yoke, as in Fig. 5, which are of a size to snugly receive the arms 11 and 12, as shown in Figs. 1 and 2.

Numerals 19 and 20 denote clamp-blocks, which are identical with each other, and they are adapted to fit between the two parallel portions of the respective yokes as in Fig. 2. The underside of each block is concave, forming a channel $a$ thereacross as in Fig. 6, the curvature thereof being such as to fit the rod C; and the upper side of each block has a channel $b$ thereacross, which is at right-angles to the channel $a$, the channel $b$ being such at to fit the curvature of the arms 11 and 12.

Numeral 21 denotes the absorbent and distributing element, which may be made of a length of felt, or fabric, or other suitable material, it being of the same length as the trough and of such width that when it is folded or doubled together it will fill the space $y$ and extend down some distance below the mouth $z$, as shown in Fig. 3. The absorbent and distributing element 21 is to be doubled together longitudinally with the bar or plate 7 between the two parts thereof, and as the bar 7 is to be made longer than the felt it is evident that the ends of the bar 7 may be grasped and the felt may be forced up into space $y$ to the position in which it is shown in Fig. 3; then after the latter operation a plurality of small bolts 22 may be inserted through the flange 6, the two layers of felt 21, the bar 7, and the side 2, which will secure the felt or absorbent in operative position as shown in Fig. 3.

*Modus operandi:* It will now be seen that if the screws 17 and 18 be slightly loosened that the trough may be moved up or down, forward or backward, until the lower edges of the felt absorbent are in the path of the reel blades H; then by tightening the screws 17 and 18 it is evident that the device will be securely locked in its adjusted position, ready for operation. The lid 8 may now be released and opened and a supply of oil and emery-dust, or other abradant, may be placed in the trough, from which it will slowly percolate downward through the mouth $z$ and then onto the felt 21, which latter will become charged with the emery in suspension.

Now as the mower is operated forward it is evident that the blades H will contact with the felt, each scraping therefrom a small portion of oil and emery, which the blades H will carry down to the blade M, and as the blades H act in shearing contact with the blade M it is evident that the emery will cut and sharpen the contacting portions of the blades, thereby accomplishing the desideratum of this invention with a minimum of time and expense.

After the abradant and oil have been placed in the trough then the lid should be closed and secured in order to exclude undesirable matter and to protect the abradant material.

I have determined that operating the mower a short time with my device in position, properly loaded, will effectually sharpen the blades, but this should be done with the mower operating idly, that is without cutting grass, as the grass will tend to dilute the abradant whereby its action will be much slower. I have found that there will be enough abradant however at all times to keep the blades properly sharpened during the time the mower is at work, and this can be advantageously done if preferred.

If one so desires he may, after sharpening the blades as stated simply loosen the screws 17 and 18 and raise the trough to a position where the blades will not contact with the felt 21, after which said screws may be tightened to hold the device out of operative position until it is again required, or the device may be entirely removed from the mower when it is not required.

Also my invention causes the lawn mower to run more easily, as the shearing contacts of the blades are continuously oiled.

I desire that it be understood that various changes may be made in the details of construction, and the form and arrangements of the various parts, and in the adaptation of the invention, without sacrificing any of the advantages of the invention or of sacrificing any of the rights covered by the appended claims.

Having now fully shown and described my invention, what I claim and desire to secure by Letters Patent of the United States, is—

1. An attachment for a lawn mower having end members and blades revolubly mounted between said members and a fixed cutter-bar having a blade with which the blades of the reel operate in shearing contact, said attachment comprising a receptacle for abradant, and means whereby the abradant is delivered from the receptacle to the movable blades while the movable blades are in operation.

2. An attachment for a lawn mower having end members and blades revolubly mounted between said members and a fixed cutter-bar having a blade with which the blades of the reel operate in shearing contact, said attachment comprising means for slowly depositing abradant and oil upon the edges of the movable blades while they are in operation and immediately prior to the movable blades contacting with the fixed blade, and means whereby the attachment may be adjusted with relation to the movable blades.

3. An attachment for a lawn mower having end members and blades revolubly mounted between said members and a fixed cutter-bar having a blade with which the movable blades operate in shearing contact, said attachment comprising a trough-like receptacle having small apertures in the lower portion thereof and extending the full length of the blades, a flexible absorbent element connected to one side of said trough and extending down therebelow and with which the movable blades are adapted to contact in order to cause the abradant passing down from the trough to be deposited thereby upon the edges of the movable blades.

4. An attachment for a lawn mower having end members connected by a tie-rod and blades forming a reel revolubly mounted between said end members and a fixed cutter-bar having a blade with which the reel-blades operate in shearing contact, said attachment comprising a trough-like receptacle extending between said end members, arms extending from the ends of the trough and adjustably secured to the tie-rod, a flexible element extending below apertures formed in the bottom of said trough and with which the reel blades are adapted to contact as the reel revolves.

5. An attachment for a lawn mower having end members and movable blades mounted between said end members and a fixed cutter-bar having a blade with which the movable blades operate in shearing contact, said attachment comprising a trough-like receptacle adapted to permit abradant to percolate therethrough by gravity, ends for the trough, one side of said trough being formed double to provide a space opening downward, a flexible absorbent element doubled upon itself and located in said space with its edges extending below the trough, a metal strip located between the two parts of the absorbent element, means for securing said strip to retain the absorbent element in position, a cover for the trough, arms extending from the ends of the trough, and means for securing said arms whereby the trough may be adjustably secured in position.

6. An attachment for a lawn mower having end members connected by a tie-rod and blades forming a reel revolubly mounted between said end members and a fixed cutter-bar having a blade with which the reel blades operate in shearing contact, said attachment comprising a trough having a narrow mouth at its lower edge, arms extending from the ends of the trough, a clamp for each of said arms which clamps are adapted to be attached to said tie-rod and each clamp comprising a U-shaped yoke having apertures in its end portions to receive its arm, a block fitting between the sides of the yoke, one face of said block having a channel to fit said tie-rod and the other face having a channel at right-angles to said first channel to fit said arm, and a screw to be inserted through the center of the yoke to contact with said tie-rod whereby the block may be clamped between the rod and the arm, all substantially as shown and described.

7. An attachment for a lawn mower having end members carried by ground wheels with a tie-rod connecting said end members and blades forming a reel revolubly mounted between the end members and a fixed cutter-bar having a blade with which the reel-blades operate in shearing contact, said attachment comprising a receptacle located parallel with and above the cutter-bar, means for adjustably securing the receptacle to the tie-rod, a flexible absorbent element located at one side of said trough with one portion thereof adapted to contact with the reel blades and extending the full length thereof, means for removably securing the absorbent element in position, the abradant material which is mixed with oil contained in the receptacle being adapted to gravitate through apertures in the trough to the absorbent element to be taken from the latter by the reel blades as they contact therewith, all substantially as set forth.

In testimony whereof I have hereunto subscribed my name to this specification in the presence of two subscribing witnesses.

WILLIAM H. MITCHELL.

Witnesses:
 ROBT. W. RANDLE,
 R. E. RANDLE.